(12) United States Patent
Li et al.

(10) Patent No.: US 9,977,981 B2
(45) Date of Patent: May 22, 2018

(54) METHOD AND APPARATUS FOR CALIBRATING A THREE-DIMENSIONAL (3D) IMAGE IN A TILED DISPLAY

(71) Applicant: Samsung Electronics Co., Ltd., Suwon-si, Gyeonggi-do (KR)

(72) Inventors: Weiming Li, Suwon-si (KR); Mingcai Zhou, Suwon-si (KR); Shandong Wang, Suwon-si (KR); Shaohui Jiao, Suwon-si (KR); Tao Hong, Suwon-si (KR); Haitao Wang, Suwon-si (KR); Ji Yeun Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 473 days.

(21) Appl. No.: 14/627,534

(22) Filed: Feb. 20, 2015

(65) Prior Publication Data
US 2015/0170399 A1  Jun. 18, 2015

Related U.S. Application Data

(63) Continuation-in-part of application No. PCT/KR2014/004327, filed on May 14, 2014.

(30) Foreign Application Priority Data

May 15, 2013 (CN) .......................... 2013 1 0178473
May 14, 2014 (KR) ........................ 10-2014-0057688

(51) Int. Cl.
*G03B 21/14* (2006.01)
*H04N 9/31* (2006.01)
(Continued)

(52) U.S. Cl.
CPC ........... *G06K 9/46* (2013.01); *H04N 13/0406* (2013.01); *H04N 13/0425* (2013.01); *H04N 13/0497* (2013.01)

(58) Field of Classification Search
None
See application file for complete search history.

(56) References Cited

U.S. PATENT DOCUMENTS 6,310,650 B1  10/2001  Johnson et al.
6,525,772 B2   2/2003  Johnson et al.
(Continued)

FOREIGN PATENT DOCUMENTS

CN    1598690 A     3/2005
CN    101782686 A   7/2010
(Continued)

OTHER PUBLICATIONS

Li, Weiming, and Youfu Li. "Generic camera model and its calibration for computational integral imaging and 3D reconstruction." JOSA A 28.3 (2011): 318-326.*
(Continued)

*Primary Examiner* — Barry Drennan
*Assistant Examiner* — Schiller Hill
(74) *Attorney, Agent, or Firm* — Harness, Dickey & Pierce, P.L.C.

(57) ABSTRACT

Provided are methods and apparatuses for calibrating a three-dimensional (3D) image in a tiled display including a display panel and a plurality of lens arrays. The method includes capturing a plurality of structured light images displayed on the display panel, calibrating a geometric model of the tiled display based on the plurality of structured light images, generating a ray model based on the calibrated geometric model of the tiled display, and rendering an image based on the ray model.

26 Claims, 16 Drawing Sheets

(51) Int. Cl.
*G06F 3/147* (2006.01)
*G06K 9/46* (2006.01)
*H04N 13/04* (2006.01)

(56) References Cited

U.S. PATENT DOCUMENTS

| | | | |
|---|---|---|---|
| 7,145,611 | B2 | 12/2006 | Dubin et al. |
| 8,390,677 | B1 | 3/2013 | Said |
| 2004/0085256 | A1* | 5/2004 | Hereld ............... H04N 9/12 345/1.1 |
| 2008/0129894 | A1 | 6/2008 | Kang et al. |
| 2010/0238090 | A1 | 9/2010 | Pomerantz et al. |
| 2011/0080723 | A1 | 4/2011 | Kaluzhny |
| 2011/0102300 | A1 | 5/2011 | Wood et al. |
| 2012/0038660 | A1 | 2/2012 | Han et al. |
| 2012/0074851 | A1 | 3/2012 | Erinjippurath |
| 2012/0075435 | A1 | 3/2012 | Hovanky et al. |
| 2013/0016081 | A1 | 1/2013 | Park et al. |

FOREIGN PATENT DOCUMENTS

| | | |
|---|---|---|
| CN | 103048866 A | 4/2013 |
| KR | 20040100007 A | 12/2004 |
| KR | 20070112081 A | 11/2007 |
| KR | 20090047689 A | 5/2009 |
| KR | 20120015578 A | 2/2012 |
| KR | 20120140665 A | 12/2012 |
| KR | 20130007778 A | 1/2013 |
| KR | 20130037326 A | 4/2013 |

OTHER PUBLICATIONS

Kooima, Robert, et al. "A multi-viewer tiled autostereoscopic virtual reality display." proceedings of the 17th ACM Symposium on Virtual Reality Software and Technology. ACM, 2010.*
Extended European Search Report for Corresponding European Patent Application No. 14798325.8 dated Sep. 16, 2016.
Li, Zhiyun, et al. "A Real-time Seamless Tiled Display System for 3d Graphics," University of Maryland at College Park. Immersive Projection Technology Symposium of the IEEE Virtual Reality 2002 Conference. (2002).
Brown, Michael, et al. "Camera-based calibration techniques for seamless multiprojector displays." IEEE Transactions on Visualization and Computer Graphics. (2005).
Aliaga, Daniel G., et al. "Fast high-resolution appearance editing using superimposed projections." Purdue University and University of California Irvine. ACM Transactions on Graphics (2012).
Bouguet, Jean-Yves. "Camera calibration toolbox for matlab." (2004).
Chen, Han, et al. "Scalable alignment of large-format multi-projector displays using camera homography trees." Proceedings of the conference on Visualization 2002. IEEE Computer Society, (2002).
Ge, Jinghua, et al. "Camera Based Automatic Calibration for the Varrier-System." University of Illinois Chicago. Computer Vision and Pattern Recognition-Workshops, IEEE Computer Society Conference on. IEEE( 2005).
Kim, Youngmin, et al. "Recent researches based on integral imaging display method." 3D Research 1.1 (2010): pp. 17-27.
Kooima, Robert, et al. "A multi-viewer tiled autostereoscopic virtual reality display." proceedings of the 17th ACM Symposium on Virtual Reality Software and Technology. ACM, (2010).
Lee, Byoungho, et al. "Three-dimensional Display and Information Processing Based on Integral Imaging." Digital Holography and Three-Dimensional Display. (2006) Chapter 12.
Lippmann, M.G. "Reversible Prints.Integral Photographs," (English translation of article by Durand, Frédo), Academy of the Sciences, Mar. 2, 1908.
Park, Jae-Hyeung, et al. "Recent progress in three-dimensional information processing based on integral imaging." Applied Optics. Dec. 2009 vol. 48, No. 34 pp. 77-94.
Zhang, Zhengyou. "A flexible new technique for camera calibration." IEEE Transactions on Pattern Analysis and Machine Intelligence, Nov. 2000 vol. 22, No. 11, pp. 1330-1334.
Salvi, Joaquim, et al. "A state of the art in structured light patterns for surface profilometry." Pattern recognition (2010) vol. 43, pp. 2666-2680.
Sandin, Daniel J., et al. "The Varrier TM Autostereoscopic Virtual Reality Display." ACM Transactions on Graphics (2005), pp. 894-903.
Teraguchi, Takehito, et al. "Three-dimensional auto-stereoscopic animated image with a long viewing distance using high-precision image correction." SIGGRAPH Aug. 3-7, 2009.
International Search Report PCT/ISA/210 for International Application No. PCT/KR2014/004327, dated Aug. 26, 2014.
Written Opinion of the International Searching Authority PCT/ISA/237 for International Application No. PCT/KR2014/004327, dated Aug. 26, 2014.
Chinese Office Action for the corresponding Chinese Application No. 201310178473.6 dated Jul. 4, 2017.

* cited by examiner

10

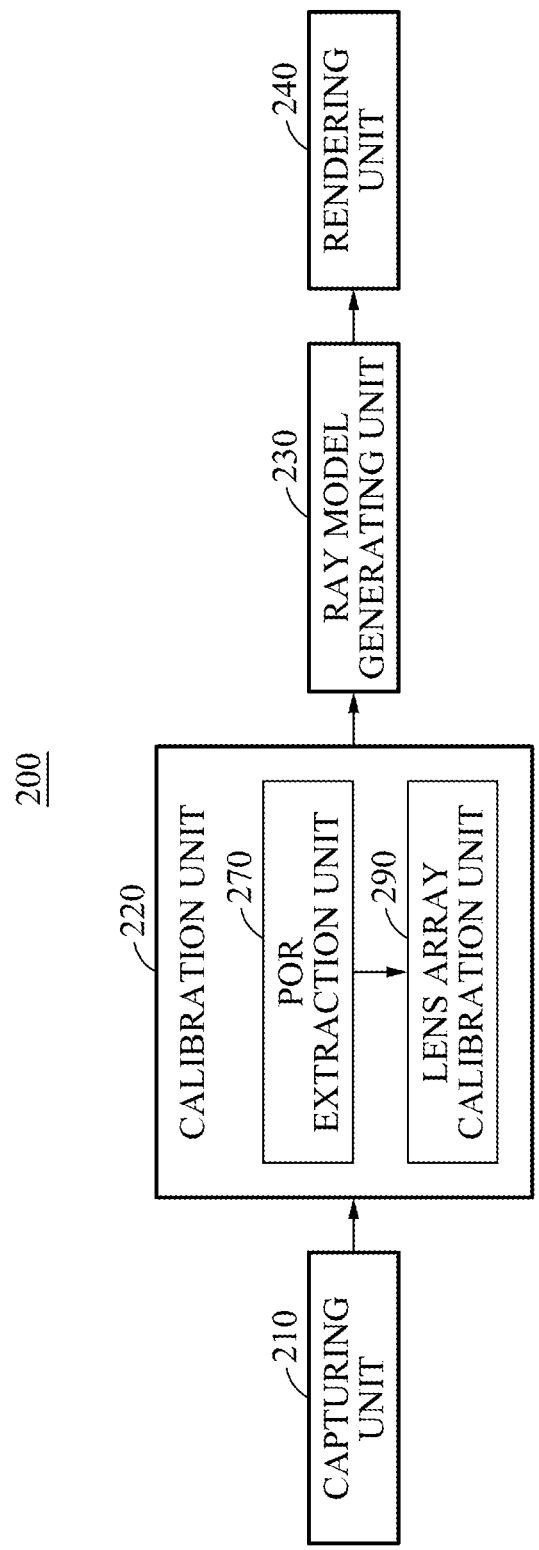

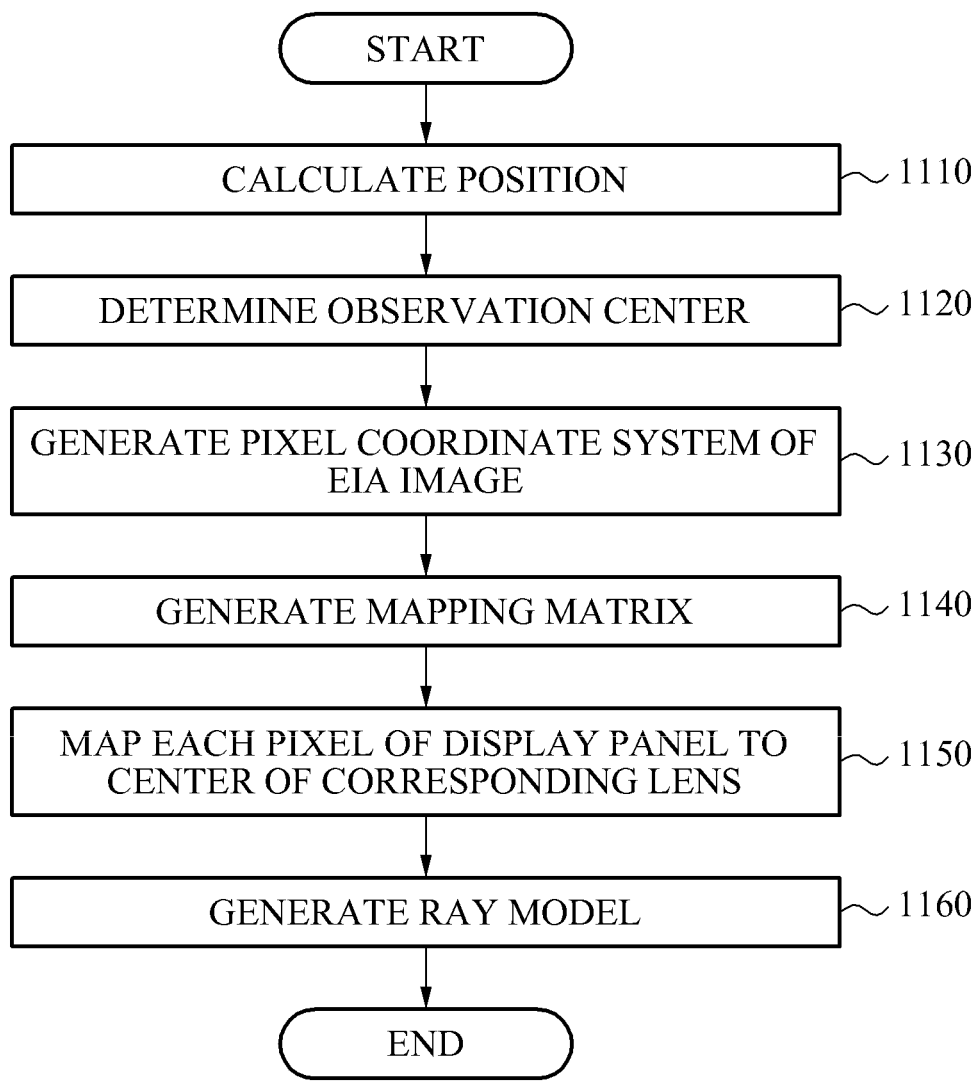

METHOD AND APPARATUS FOR CALIBRATING A THREE-DIMENSIONAL (3D) IMAGE IN A TILED DISPLAY

CROSS REFERENCE TO RELATED APPLICATIONS

This application is a Continuation in Part of International Application No. PCT/KR2014/004327, filed on May 14, 2014, and claims priority under 35 U.S.C. § 119 to Chinese Patent Application No. 201310178473.6, filed on May 15, 2013, and Korean Patent Application No. 10-2014-0057688, filed on May 14, 2014, the entire contents of each of which are incorporated by reference.

TECHNICAL FIELD

At least one example embodiment relates to methods and apparatuses for calibrating a three-dimensional (3D) image in a tiled display.

BACKGROUND

An integral imaging display (IID) is display technology that enables a user to view a three-dimensional (3D) image with the naked eye. The IID includes a liquid crystal display (LCD) panel and a lens array. The LCD panel may display a two-dimensional (2D) image called an elemental image array (EIA), and the lens array may generate a 3D image by refracting different portions in the EIA in different directions in a 3D space.

In relation to an IID for a large screen, the tiled integral imaging display (T-IID) technology configures a large lens array by combining small lens arrays. However, in the T-IID technology, an accurate combination of different lens arrays may be difficult and a misalignment between the different lens arrays may occur due to restrictions on precision of component installation, a change in temperature occurring during usage, and/or mechanical oscillation.

SUMMARY

According to at least one example embodiment, there is provided a method of calibrating a three-dimensional (3D) image in a tiled display including a display panel and a plurality of lens arrays, the method including capturing a plurality of structured light images displayed on the display panel, calibrating a geometric model of the tiled display based on the plurality of structured light images, generating a ray model based on the calibrated geometric model of the tiled display, and rendering an image based on the ray model.

According to at least one example embodiment, the calibrating may include extracting principal observation ray (POR) pixels corresponding to light rays passing through an optical center of a capturing device from the plurality of structured light images, and calibrating the geometric model of the tiled display based on the extracted POR pixels.

According to at least one example embodiment, the extracting may include generating a correspondence map between pixels of the display panel and pixels of the capturing device by decoding the plurality of structured light images, and extracting the POR pixels using the correspondence map.

According to at least one example embodiment, the extracting may include generating a correspondence map between pixels of the display panel and pixels of the capturing device by decoding the plurality of structured light images, extracting a boundary of a lens included in the plurality of lens arrays by filtering the correspondence map through a gradient filter, extracting first POR pixels from the plurality of structured light images based on the extracted boundary, extracting second POR pixels based on the extracted first POR pixels and respective structures of the plurality of lens arrays, and verifying whether a sum of a number of the first POR pixels and a number of the second POR pixels corresponds to a desired value, and transmitting the first POR pixels and the second POR pixels as the extracted POR pixels based on a result of the verifying.

According to at least one example embodiment, the calibrating may include calculating rotation and translation parameters of the plurality of lens arrays with respect to the display panel based on the extracted POR pixels, and calibrating the geometric model of the tiled display based on the calculated rotation and translation parameters.

According to at least one example embodiment, the calibrating may include converting rotation and translation between a coordinate system defined on a plane of the plurality of lens arrays and a coordinate system defined on a plane of the display panel into two-dimensional (2D) rotation and translation, calculating coordinates of the optical center of the capturing device based on the extracted POR pixels, estimating the rotation and translation parameters based on the 2D rotation and translation and the coordinates of the optical center, and calibrating the geometric model of the tiled display based on estimated rotation and translation parameters.

According to at least one example embodiment, the generating may include calculating a position of each lens included in the plurality of lens arrays with respect to the display panel based on the calibrated geometric model of the tiled display, specifying an observation plane and determining an observation center on the observation plane, generating a pixel coordinate system of the image and generating a mapping matrix based on the pixel coordinate system, and generating the ray model by mapping each pixel of the display panel to a center of a corresponding lens based on the calculated position, the determined observation center, and the generated mapping matrix.

According to at least one example embodiment, the ray model may be displayed using a two plane straight notation.

According to at least one example embodiment, the extracting of the second POR pixels may include predicting positions of the second POR pixels based on the first POR pixels, determining a detection window based on the predicted positions of the second POR pixels, generating a value of an energy function based on a local gradient amplitude histogram with respect to pixels included in the detection window, and extracting the second POR pixels from the pixels included in the detection window based on the value of the energy function.

According to at least one example embodiment, there is provided a display system including a tiled display including a display panel and a plurality of lens arrays, and an image processing device to capture a plurality of structured light images displayed on the display panel, calibrate a geometric model of the tiled display based on the plurality of structured light images, generate a ray model based on the calibrated geometric model of the tiled display, and render an image based on the ray model.

According to at least one example embodiment, the image processing device may include a capturing device configured to capture the plurality of structured light images, a calibration device configured to calculate rotation and translation parameters of the plurality of lens arrays with respect to the display panel based on the plurality of structured light images, and calibrate the geometric model of the tiled display based on the calculated rotation and translation parameters, a ray model generating device configured to generate the ray model based on the calibrated geometric model of the tiled display, and a rendering device configured to render the image based on the ray model.

According to at least one example embodiment, the calibration device may include a POR extraction device configured to extract POR pixels corresponding to light rays passing through an optical center of the capturing device from the plurality of structured light images, and a lens array calibration device configured to calculate the rotation and translation parameters based on the extracted POR pixels, and calibrate the geometric model of the tiled display based on the rotation and translation parameters.

According to at least one example embodiment, the POR extraction device may generate a correspondence map between pixels of the display panel and pixels of the capturing device by decoding the plurality of structured light images, and extract the POR pixels using the correspondence map.

According to at least one example embodiment, the POR extraction device may include a pixel analysis device configured to generate a correspondence map between pixels of the display panel and pixels of the capturing device by decoding the plurality of structured light images, an edge extraction device configured to extract a boundary of a lens included in the plurality of lens arrays by filtering the correspondence map through a gradient filter, and a pixel extraction device configured to extract first POR pixels and second POR pixels based on the extracted boundary and respective structures of the plurality of lens arrays, verify whether a sum of a number of the first POR pixels and a number of the second POR pixels corresponds to a desired value, and transmit the first POR pixels and the second POR pixels as the extracted POR pixels based on a result of the verifying.

According to at least one example embodiment, the lens array calibration device may include a conversion device configured to convert rotation and translation between a coordinate system defined on a plane of the plurality of lens arrays and a coordinate system defined on a plane of the display panel into 2D rotation and translation, an optical center calculation device configured to calculate coordinates of the optical center of the capturing device based on the extracted POR pixels, and a parameter estimation device configured to estimate the rotation and translation parameters based on the 2D rotation and translation and the coordinates of the optical center, and calibrate the geometric model of the tiled display based on the estimated rotation and translation parameters.

At least one example embodiment is directed to a device for calibrating a three-dimensional (3D) image in a tiled display that includes a display panel and a plurality of lens arrays. The device includes an image processing device configured to receive a plurality of images captured from the display panel by a capturing device, the plurality of images having desired image patterns on the display panel, calibrate a geometric model of the tiled display based on the plurality of images, generate a ray model based on the calibrated geometric model of the tiled display, and render an image based on the ray model.

According to at least one example embodiment, the image processing device is configured to extract principal observation ray (POR) pixels corresponding to light rays passing through an optical center of the capturing device from the plurality of images, and calibrate the geometric model of the tiled display based on the extracted POR pixels.

According to at least one example embodiment, the image processing device is configured to extract the POR pixels by generating a correspondence map between pixels of the display panel and pixels of the capturing device by decoding the plurality of images, and extracting the POR pixels using the correspondence map.

According to at least one example embodiment, the image processing device is configured to extract the POR pixels by generating a correspondence map between pixels of the display panel and pixels of the capturing device by decoding the plurality of images, extracting a boundary of a lens included in the plurality of lens arrays by filtering the correspondence map through a gradient filter, extracting first POR pixels from the plurality of images based on the extracted boundary, extracting second POR pixels based on the extracted first POR pixels and respective structures of the plurality of lens arrays, and verifying whether a sum of a number of the first POR pixels and a number of the second POR pixels corresponds to a desired value, and transmitting the first POR pixels and the second POR pixels as the extracted POR pixels based on a result of the verifying.

According to at least one example embodiment, the image processing device is configured to calibrate the geometric model by calculating rotation and translation parameters of the plurality of lens arrays with respect to the display panel based on the extracted POR pixels, and calibrating the geometric model of the tiled display based on the calculated rotation and translation parameters.

According to at least one example embodiment, the image processing device is configured to calibrate the geometric model by converting rotation and translation between a coordinate system defined on a plane of the plurality of lens arrays and a coordinate system defined on a plane of the display panel into two-dimensional (2D) rotation and translation, calculating coordinates of the optical center of the capturing device based on the extracted POR pixels, estimating the rotation and translation parameters based on the 2D rotation and translation and the coordinates of the optical center, and calibrating the geometric model of the tiled display based on the estimated rotation and translation parameters.

According to at least one example embodiment, the image processing device is configured to generate the ray model by calculating a position of each lens included in the plurality of lens arrays with respect to the display panel based on the calibrated geometric model of the tiled display, specifying an observation plane and determining an observation center on the observation plane, generating a pixel coordinate system of the image and generating a mapping matrix based on the pixel coordinate system, and generating the ray model by mapping each pixel of the display panel to a center of a corresponding lens based on the calculated position, the determined observation center, and the generated mapping matrix.

According to at least one example embodiment, the image processing device is configured to cause the tiled display to display the ray model using a two plane straight notation.

According to at least one example embodiment, the image processing device is configured to extract the second POR pixels by predicting positions of the second POR pixels based on the first POR pixels, determining a detection window based on the predicted positions of the second POR pixels, generating a value of an energy function based on a local gradient amplitude histogram with respect to pixels included in the detection window, and extracting the second POR pixels from the pixels included in the detection window based on the value of the energy function.

According to at least one example embodiment, the device further comprises at least one of wired connections and wireless connections configured to communicate information between the image processing device, the tiled display, and the capturing device, the information including the plurality of images and the rendered image.

According to at least one example embodiment, the device further comprises a memory configured to store the information.

According to at least one example embodiment, the capturing device is a pinhole camera.

At least one example embodiment is directed to a method for calibrating a three-dimensional (3D) image in a tiled display that includes a display panel and a plurality of lens arrays. The method includes receiving a plurality of images captured from the display panel by a capturing device, the plurality of images having desired image patterns on the display panel, calibrating a geometric model of the tiled display based on the plurality of images, generating a ray model based on the calibrated geometric model of the tiled display, and rendering an image based on the ray model.

BRIEF DESCRIPTION OF THE DRAWINGS

FIGS. 2A-2C are block diagrams illustrating an image processing device of FIG. 1;

FIG. 14 is a flowchart illustrating an operating method of the ray model generating unit of FIGS. 2A-2C.

DETAILED DESCRIPTION OF EXAMPLE EMBODIMENTS

Figure 1:
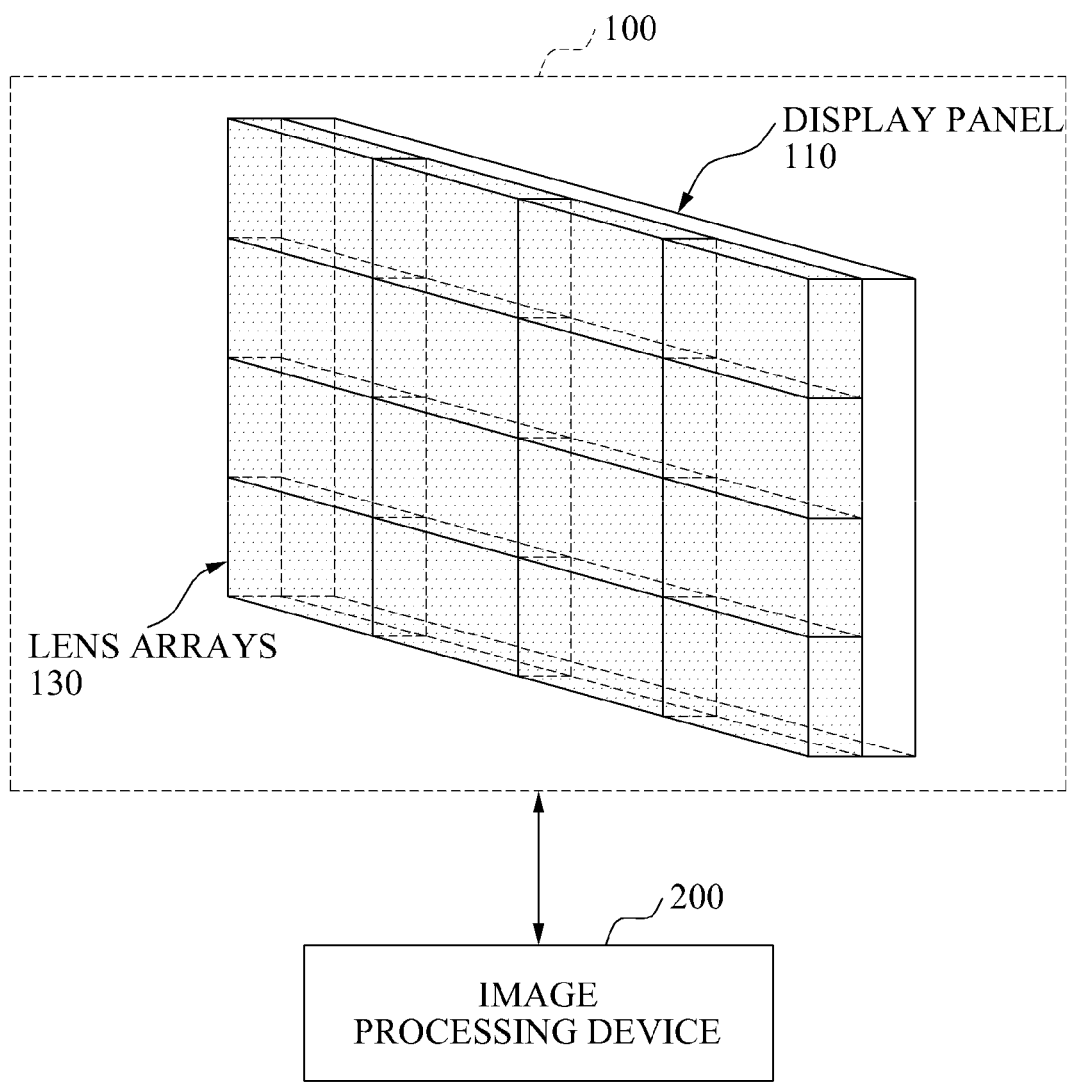
FIG. 1 illustrates a display system according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a display system according to at least one example embodiment.

Referring to FIG. 1, a display system 10 may include a tiled integral imaging display (T-IID) 100 and an image processing device 200.

The T-IID 100 may form a large screen three-dimensional (3D) display by combining a plurality of integral imaging displays (IIDs). The T-IID 100 may include a display panel 110 and a plurality of lens arrays 130. The display panel 110 be implemented using a liquid crystal display (LCD) panel. The display panel 110 may also be implemented using a touch screen panel, a thin film transistor-liquid crystal display (TFT-LCD) panel, a light emitting diode (LED) display panel, an organic light emitting diode (OLED) display panel, an active matrix organic light emitting diode (AMOLED) display panel, a flexible display panel, etc. The plurality of lens arrays 130 may generate a 3D image by refracting rays emitted from an elemental image array (EIA) of the display panel 110. The display panel 110 may be implemented using a large screen display panel. The T-IID 100 may be a large screen 3D display including a large screen display panel 110 and a plurality of combined lens arrays 130. For example, the display panel 110 may include a plurality of small display panels disposed and aligned on an identical plane.

The image processing device 200 may control an overall operation of the display system 10. The image processing device 200 may be implemented using a printed circuit board (PCB) such as, for example, a motherboard, an integrated circuit (IC), or a system on chip (SoC). For example, the image processing device 200 may be an application processor.

The image processing device 200 may refer to a device to calibrate a 3D image in the T-IID 100. The image processing device 200 may capture a structured light image and calibrate a geometric model of the T-IID 100 based on the structured light image when a misalignment occurs between different IID units, for example, different lens arrays 130, included in the T-IID 100. In at least one example embodiment, a structured light image may refer to an image with a known (or desired) image pattern (e.g., a checkered pattern). The structured light image or desired image pattern may be displayed on the T-IID 100.

Figure 2B:
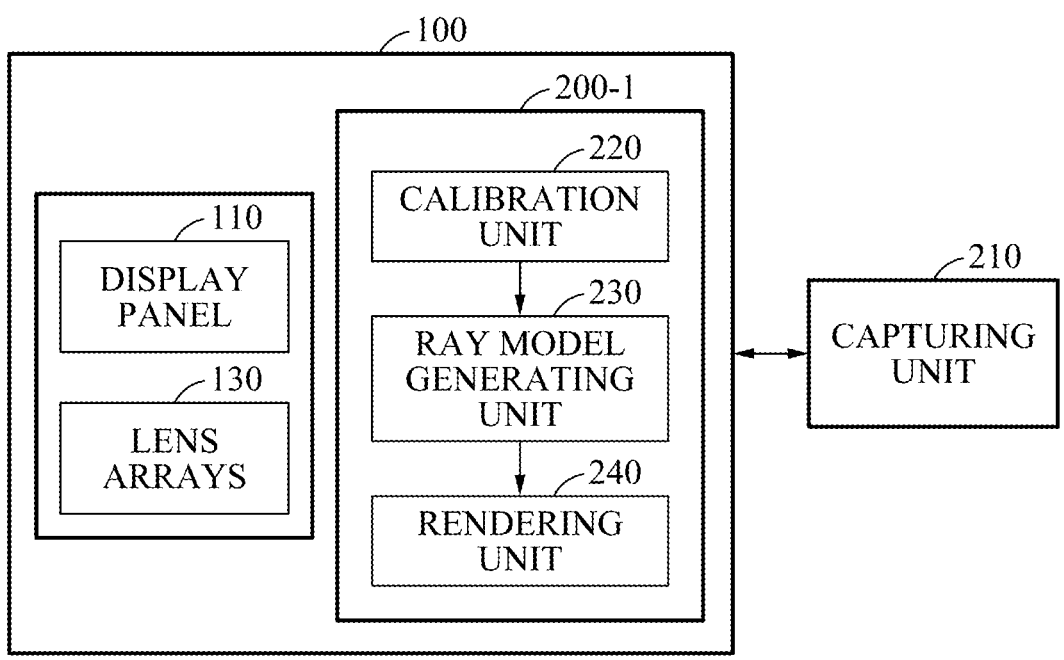
Figure 2C:
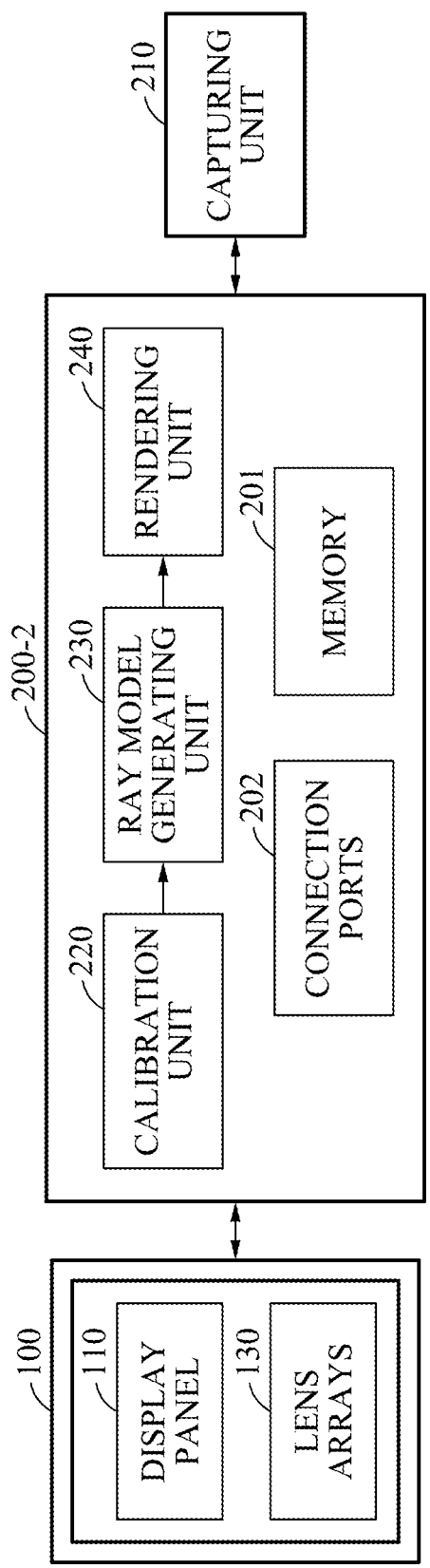

FIGS. 2A-2C are block diagrams illustrating the image processing device of FIG. 1.

Referring to FIGS. 1 and 2A, the image processing device 200 may include a capturing unit 210, a calibration unit 220, a ray model generating unit 230, and a rendering unit 240. Throughout the entirety of this description, the term "unit" is interchangeable with the term "device."

The capturing unit 210 may capture a structured light image displayed on the display panel 110 of the T-IID 100 at a fixed location. The capturing unit 210 may be implemented using, for example, a camera (e.g., a pinhole camera), and/or a video camera. The capturing unit 210 may sequentially capture a plurality of structured light images.

In detail, when a structured light image is displayed on the display panel 110, the capturing unit 210 may capture the structured light image. When another structured light image is displayed on the display panel 110, the capturing unit 210 may capture the other structured light image. The capturing unit 210 may iteratively perform the foregoing process until all structured light images displayed on the display panel 110 are captured. The capturing unit 210 may transmit the captured plurality of structured light images to the calibration unit 220.

The calibration unit 220 may calibrate a geometric model of the T-IID 100. The calibration unit 220 may obtain geometric parameter information from the structured light images captured by the capturing unit 210 to calibrate the geometric model of the T-IID 100. The geometric model of the T-IID 100 may be a set of virtual lens arrays with respect to the plurality of lens arrays 130. The virtual lens arrays may correspond to the plurality of lens arrays 130, respectively. As another example, the virtual lens arrays may correspond to groups including the plurality of lens arrays 130, respectively.

Although FIG. 2A shows that image processing device 200 may include the capturing unit 210, the calibration unit 220, the ray model generating unit 230, and the rendering unit 240, example embodiments are not limited thereto. For example, as shown in FIG. 2B, the calibration unit 220, ray model generating unit 230, and rendering unit 240 may be part of an image processing device 200-1 within the T-IID 100 while the capturing unit 210 is a separate device connected to the image processing device 200-1.

In another example, as shown in FIG. 2C, an image processing device 200-2 may include the calibration unit 220, the ray model generator 230, and the rendering unit 240 while the T-IID 100 and the capturing unit 210 are separate devices connected to the image processing device 200-2. In FIG. 2C, the image processing device 200-2 may be, for example, a dongle capable of connecting to the T-IID 100 and the capturing unit 210 via one or more connection ports 202. The connection ports 202 may include suitable wired connectors (e.g., Universal Serial Bus (USB) connectors) or wireless connections (e.g., Wifi, short-range wireless technologies, etc.). The wired connectors and/or wireless connections may communicate information between the image processing device 200-2, the capturing unit 210, and the T-IID 100. The information may include information relevant to calibration methods of inventive concepts such as the plurality of structured light images captured by the capturing device 210 and/or the rendered image produced by rendering unit 240. The image processing device 200-2 may also include a memory 201 (e.g., a nonvolatile memory) configured to store the information such that the image processing device 200-2 may be easily detachable from the capturing unit 210 and/or the T-IID 100 without losing the information. This may contribute to increased mobility and user-friendliness of the image processing device 200-2.

Figure 3:
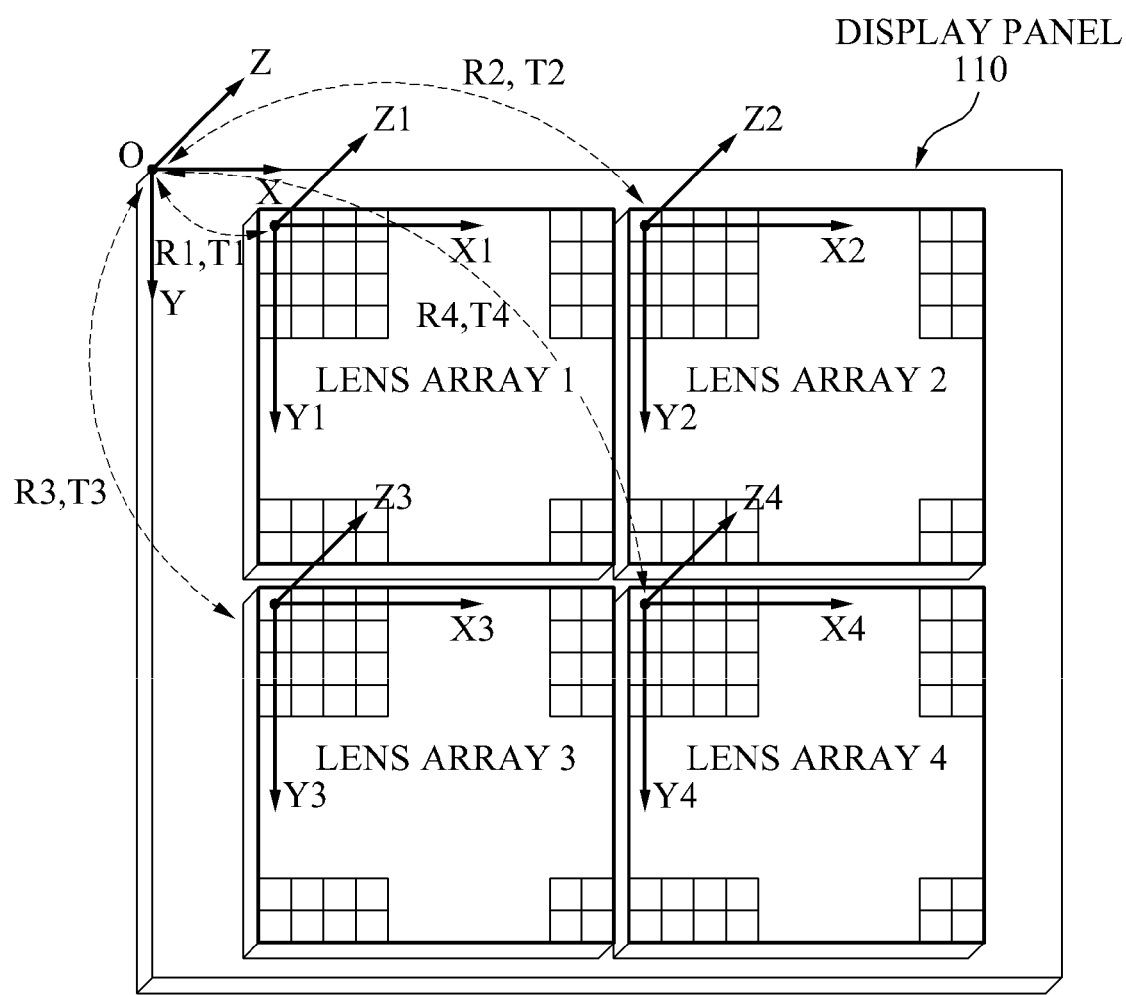
FIG. 3 illustrates a geometric model of a tiled integral imaging display (T-IID)

FIG. 3 illustrates a geometric model of a T-IID. For ease of description, FIG. 3 illustrates only four of the plurality of lens arrays 130.

Referring to FIGS. 1 through 3, the geometric model of the T-IID 100 may have rotation parameters R1 through R4 and translation parameters T1 through T4 with respect to the display panel 110. For example, Ri corresponds to a 3×3 rotation matrix, and denotes a rotation of an i-th lens array. Ti denotes a translation vector of the i-th lens array.

The calibration unit 220 of FIGS. 2A-2C may include a principal observation ray (POR) extraction unit 270 and a lens array calibration unit 290. The POR extraction unit 270 may extract POR pixels corresponding to light rays passing through an optical center of the capturing unit 210 based on the plurality of structured light images. For example, the POR extraction unit 270 may generate a correspondence map between pixels of the display panel 110 and pixels of the capturing unit 210 by decoding the plurality of structured light images, and extract the POR pixels using the correspondence map. The decoding operation is described in more detail below with reference to the description of FIGS. 4, 5, and 12. The lens array calibration unit 290 may calculate rotation and translation parameters of the plurality of lens arrays 130 with respect to the display panel 110 based on the extracted POR pixels, and calibrate the geometric model of the T-IID 100 based on the calculated rotation and translation parameters.

Figure 4:
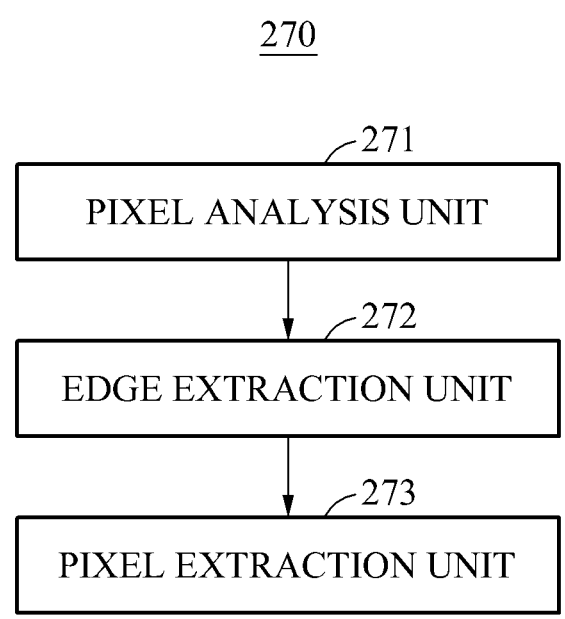
FIG. 4 is a block diagram illustrating a principal observation ray (POR) extraction unit of FIGS. 2A-2C.

FIG. 4 is a block diagram illustrating the POR extraction unit of FIGS. 2A-2C, and FIG. 5 illustrates an operating method of the POR extraction unit.

Referring to FIGS. 1 through 5, the POR extraction unit 270 may include a pixel analysis unit 271, an edge extraction unit 272, and a pixel extraction unit 273.

The pixel analysis unit 271 may generate a correspondence map between pixels of the display panel 110 and pixels of the capturing unit 210 by decoding a plurality of structured light images captured by the capturing unit 210. For example, the pixel analysis unit 271 may generate the correspondence map by mapping the pixels of the capturing unit 210 to the pixels of the display panel 110, respectively, based on the plurality of structured light images. Each pixel of the capturing unit 210 may correspond to a single light ray in a 3D space. A light ray may be refracted by a lens included in a corresponding lens array from among the plurality of lens arrays 130, and intersect a pixel of the display panel 110. Thus, the pixels of the capturing unit 210 may be mapped to the pixels of the display panel 110, respectively.

The edge extraction unit 272 may extract a boundary of a lens included in the plurality of lens arrays 130 by filtering the correspondence map through a gradient filter (e.g., a Sobel Filter). For example, the edge extraction unit 272 may extract the boundary of the lens by detecting a radical change in the correspondence map through the gradient filter. To increase an efficiency, the edge extraction unit 272 may extract an edge of a portion of lenses, rather than extracting edges of all lenses included in the plurality of lens arrays 130.

Figure 5:
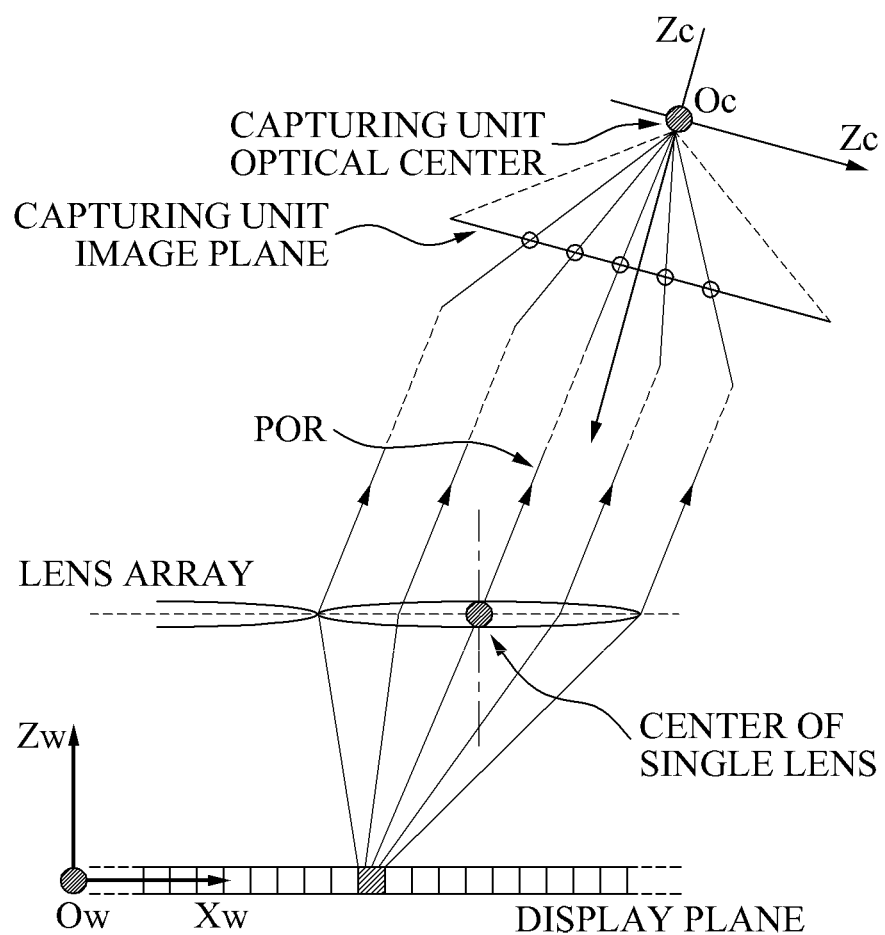
FIG. 5 illustrates an operating method of a POR extraction unit.

The pixel extraction unit 273 may extract a light ray passing through the optical center of the capturing unit 210 as a POR. Since a light ray passing through the optical center of the capturing unit 210 may pass through a center of a lens of the capturing unit 210, a transmission direction may be unchanged. Thus, geometric information thereof may be easily used. A POR may pass through the optical center of the capturing unit 210 and an optical center of a lens. As illustrated in FIG. 5, a pixel corresponding to a POR in a lens array may correspond to a center of a lens of the lens array. Hereinafter, a POR pixel refers to a lens, and may be used to be distinct from a pixel of the display panel 110 and a pixel of the capturing unit 210.

The pixel extraction unit 273 may extract first POR pixels from the plurality of structured images based on the extracted boundary of the lens. In this example, a number of the first POR pixels may correspond to a first desired (or alternatively, predetermined) value. The first POR pixels may be preset as initial POR pixels, or automatically detected through a detection device (not shown).

Figure 6:
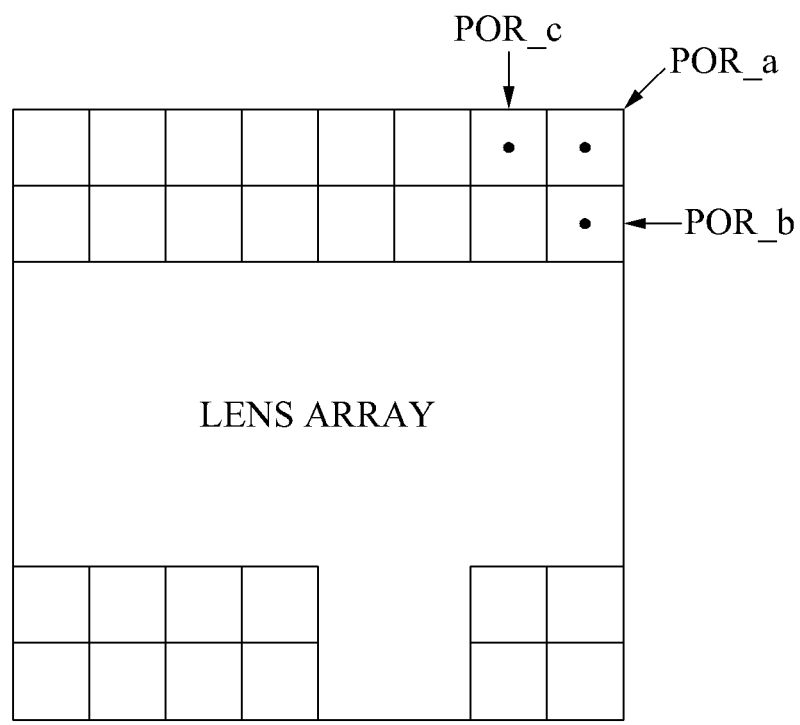
FIG. 6 illustrates initial POR pixels.

As shown in FIG. 6, three POR pixels POR_a, POR_b, and POR_c may be provided with respect to a single lens array and set as the first POR pixels. In this example, the first desired (or alternatively, predetermined) value corresponds to three. One POR pixel POR_a may be positioned at a single corner lens of the lens array, and the other two POR pixels POR_b and POR_c may be positioned adjacent to the POR pixel POR_a, whereby directions of two edges of the lens array may be provided.

The pixel extraction unit 273 may extract second POR pixels based on the first POR pixels and respective structures of the plurality of lens arrays 130. For example, the pixel extraction unit 273 may predict positions of the second POR pixels based on the first POR pixels and the respective structures of the plurality of lens arrays 130, and determine a detection window based on the predicted positions of the second POR pixels. The structures of the lens arrays 130 may respectively include a lens shape, a lens pitch, a lens arrangement, a focal length, and a lens array size. The pixel extraction unit 273 may generate an energy function at a position of each pixel included in the detection window, determine a possibility of each pixel being extracted as a second POR pixel, select POR pixels having highest possibilities, and extract the selected POR pixels as the second POR pixels. For example, the pixel extraction unit 273 may use an energy function based on a local gradient amplitude histogram. A value of an energy function of each pixel may correspond to a sum of image gradient amplitude values within the detection window, for example, a local rectangular window, including a periphery of each pixel. The detection window may refer to a square or rectangular image region, and a length of a single edge thereof may correspond to 0.5 times a diameter of a lens of the capturing unit 210 capturing a structured light image. The smaller a value of an energy function of a pixel, the higher a possibility of the pixel being included in the second POR pixels. The pixel extraction unit 273 may determine pixels having lowest values of the energy function to be the second POR pixels. The pixel extraction unit 273 may verify whether a sum of a number of the first POR pixels and a number of the second POR pixels corresponds to a second desired (or alternatively, predetermined) value, and transmit the first POR pixels and the second POR pixels to the lens array calibration unit 290 based on a result of the verifying. The second desired (or alternatively, predetermined) value may be preset.

For example, when the sum of the number of the first POR pixels and the number of the second POR pixels is equal to or greater than the second desired (or alternatively, predetermined) value, the pixel extraction unit 273 may transmit the first POR pixels and the second POR pixels to the lens array calibration unit 290. When the sum of the number of the first POR pixels and the number of the second POR pixels is less than the second desired (or alternatively, predetermined) value, the pixel extraction unit 273 may extract possible subsequent POR pixels based on the first POR pixels, the second POR pixels, and the respective structures of the plurality of lens arrays 130. The pixel extraction unit 273 may iteratively perform the foregoing process until the number of the POR pixels is equal to or greater than the second desired (or alternatively, predetermined) value.

The lens array calibration unit 290 may calculate respective states of the plurality of lens arrays 130 with respect to the display panel 110 based on the POR pixels extracted from the POR extraction unit 270. A state of a lens array may include rotation and translation parameters.

Figure 7:
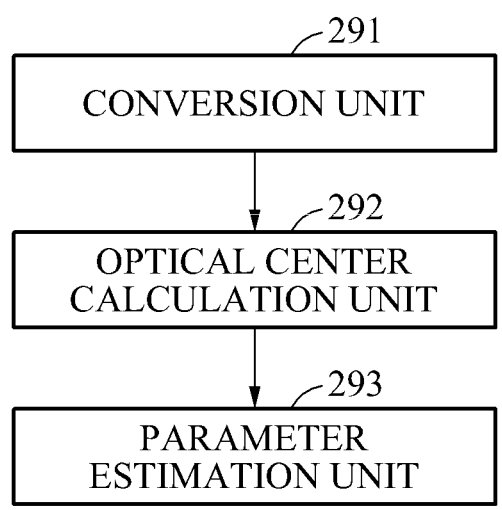
FIG. 7 is a block diagram illustrating a lens array calibration unit of FIGS. 2A-2C.

FIG. 7 is a block diagram illustrating the lens array calibration unit of FIGS. 2A-2C, and FIG. 8 illustrates an operating method of the lens array calibration unit of FIGS. 2A-2C.

Referring to FIG. 7, the lens array calibration unit 290 may include a conversion unit 291, an optical center calculation unit 292, and a parameter estimation unit 293.

Figure 8:
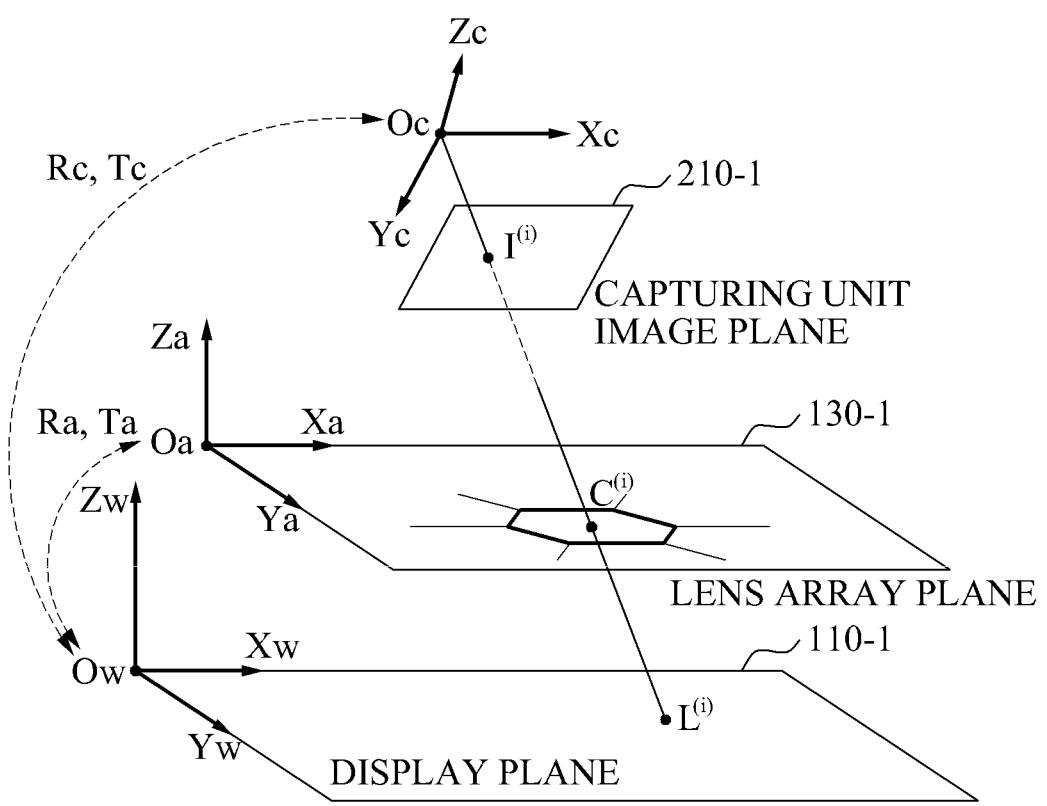
FIG. 8 illustrates an operating method of the lens array calibration unit of FIGS. 2A-2C.

As shown in FIG. 8, three coordinate systems OwXwYwZw, OaXaYaZa, and OcXcYcZc may be defined with respect to a display panel plane 110-1, a lens array plane 130-1, and a capturing unit image plane 210-1, respectively. For example, a world coordinate system OwXwYwZw may be defined on the display panel plane 110-1, and the coordinate system OaXaYaZa may be defined on the lens array plane 130-1. The coordinate system OcXcYcZc may be defined on the capturing unit 210, and $O_c$ may be the optical center of the capturing unit 210.

An i-th lens included in a k-th lens array may be expressed by $C^{(i)}=[C_x^{(i)}, C_y^{(i)}, C_z^{(i)}]^T$ in the coordinate system OwXwYwZw. $C_x^{(i)}$, $C_y^{(i)}$, and $C_z^{(i)}$ denote an x coordinate, a y coordinate, and a z coordinate of the i-th lens included in the k-th lens array in the coordinate system OwXwYwZw, respectively. Since a distance from the k-th lens array to the display panel 110 is fixed, $C_z^{(i)}$ may be a fixed value.

The i-th lens included in the k-th lens array may be expressed by $\hat{C}^{(i)}=[\hat{C}_x^{(i)}, \hat{C}_y^{(i)}, \hat{C}_z^{(i)}]^T$ in the coordinate system OaXaYaZa. $\hat{C}_x^{(i)}$, $\hat{C}_y^{(i)}$, and $\hat{C}_z^{(i)}$ denote an x coordinate, a y coordinate, and a z coordinate of the i-th lens included in the k-th lens array in the coordinate system OaXaYaZa, respectively. Since the k-th lens array is located on the lens array plane 130-1, $\hat{C}_z^{(i)}$ may be equal to "0".

The conversion unit 291 may convert rotation and translation between the coordinate system OwXwYwZw and the coordinate system OaXaYaZa into two-dimensional (2D) rotation and translation, as expressed by Equation 1.

$$\begin{bmatrix} C_x^{(i)} \\ C_y^{(i)} \end{bmatrix} = \begin{bmatrix} \cos(a^{(k)}) & -\sin(a^{(k)}) \\ \sin(a^{(k)}) & \cos(a^{(k)}) \end{bmatrix} \begin{bmatrix} \hat{C}_x^{(i)} \\ \hat{C}_y^{(i)} \end{bmatrix} + \begin{bmatrix} t_x^{(k)} \\ t_y^{(k)} \end{bmatrix} \quad \text{[Equation 1]}$$

In Equation 1, $a^{(k)}$ denotes a rotational angle with respect to an LCD panel of the k-th lens array, and $$\begin{bmatrix} t_x^{(k)} \\ t_y^{(k)} \end{bmatrix}$$

denotes a translation vector of the k-th lens array with respect to the LCD panel. $C_z^{(i)}$ may be expressed by g. The value g is a known quantity denoting a distance between an optical center of a lens and the display panel plane 130-1.

The optical center calculation unit 292 may calculate coordinates of the optical center $O_c=[O_x, O_y, O_z]^T$ of the capturing unit 210 based on the POR pixels extracted by the POR extraction unit 270. $O_x$, $O_y$, and $O_z$ denote an x coordinate, a y coordinate, and a z coordinate of the optical center of the capturing unit 210 in the coordinate system OcXcYcZc, respectively.

The optical center calculation unit 292 may use the POR pixels extracted by the POR extraction unit 270 for a planar homography between the capturing unit image plane 210-1 and the display panel plane 130-1. For example, a POR may pass through a pixel $L^{(i)}$ of the display panel 130 and an optical center $C^{(i)}$ of a lens, and be located at a pixel $I^{(i)}$ of the capturing unit image plane 210-1. A correspondence relationship between a pixel of the display panel 110 and a pixel of the capturing unit 210 may be obtained based on the plurality of structured light images, and expressed by a correspondence point pair $\{L^{(i)}, I^{(i)}\}$. $L^{(i)}$ and $I^{(i)}$ denote a point on the display panel plane 130-1 and a point on the capturing unit image plane 210-1 through which a POR passes, respectively.

The parameter estimation unit 293 may estimate rotation and translation parameters of the plurality of lens arrays 130 with respect to the display panel 110 based on the 2D rotation and translation, and the coordinates of the optical center of the capturing unit 210.

Three points $O_c$, $C^{(i)}$, and $L^{(i)}$ located on a single POR may be expressed by Equation 2.

$$\begin{cases} (L_x^{(i)} - O_x)(C_x^{(i)} - O_x) + (C_x^{(i)} - O_x)O_z = 0 \\ (L_y^{(i)} - O_y)(C_z^{(i)} - O_z) + (C_y^{(i)} - O_y)O_z = 0 \end{cases}$$ [Equation 2]

In Equation 2, $L_x^{(i)}$ and $L_y^{(i)}$ denote an x coordinate and a coordinate of $L^{(i)}$ in the coordinate system OwXwYwZw, respectively. Equation 2 may be re-expressed by Equation 3.

$$\begin{cases} a_1^{(i)}C_x^{(i)} + b_1^{(i)}C_y^{(i)} + c_1^{(i)}C_z^{(i)} = d_1^{(i)} \\ a_2^{(i)}C_x^{(i)} + b_2^{(i)}C_y^{(i)} + c_2^{(i)}C_z^{(i)} = d_2^{(i)} \end{cases}$$ [Equation 3]

In Equation 3, $a_1^{(i)}=O_z$, $b_1^{(i)}=0$, $c_1^{(i)}=L_x^{(i)}-O_x$, $d_1^{(i)}=L_x^{(i)}O_z$ and $a_2^{(i)}=0$, $b_2^{(i)}=O_z$, $c_2^{(i)}=L_y^{(i)}-O_x$, $d_2^{(i)}=L_y^{(i)}O_z$ may be satisfied. $O_c$ and $L^{(i)}$ may be estimated and thus, parameters of Equation 3 may be estimated.

By substituting Equation 1 for Equation 3, a value indicating rotation and translation of the k-th lens array with respect to the display panel 110 may be expressed by $G=[\cos(a^{(k)}), \sin(a^{(k)}), t_x^{(k)}, t_y^{(k)}]^T$. Equation 4 may be expressed as follows.

$$\begin{bmatrix} a_1^{(i)}\hat{C}_x^{(i)} & -a_1^{(i)}\hat{C}_y^{(i)} & a_1^{(i)} & 0 \\ b_2^{(i)}\hat{C}_y^{(i)} & -b_2^{(i)}\hat{C}_x^{(i)} & 0 & b_2^{(i)} \end{bmatrix} G = \begin{bmatrix} d_1^{(i)} - c_1^{(i)}g \\ d_2^{(i)} - c_2^{(i)}g \end{bmatrix}$$ [Equation 4]

Equation 4 may be expressed by $A^{(i)}G=D^{(i)}$, and combined with M PORs (M≥0, integer) to obtain Equation 5.

$$AG=D$$ [Equation 5]

In Equation 5, $A=[(A^{(1)})^T, (A^{(2)})^T, \ldots, (A^{(M)})^T]^T$ and $D=[(D^{(1)})^T, (D^{(2)})^T, \ldots, (D^{(M)})^T]^T$ may be satisfied. Thus, a rotation and translation parameter G of the k-th lens array with respect to the display panel 110 may be obtained using a least mean square estimation.

$$G=(A^TA)^{-1}A^TD$$ [Equation 6]

Through the above calculation, the parameter estimation unit 293 may obtain the rotation and translation parameters of the plurality of lens arrays 130 with respect to the display panel 110, and calibrate the geometric model of the T-IID 100.

The calibrated geometric model of the T-IID 100 may be transmitted to the ray model generating unit 230 of FIGS. 2A-2C.

Figure 9:
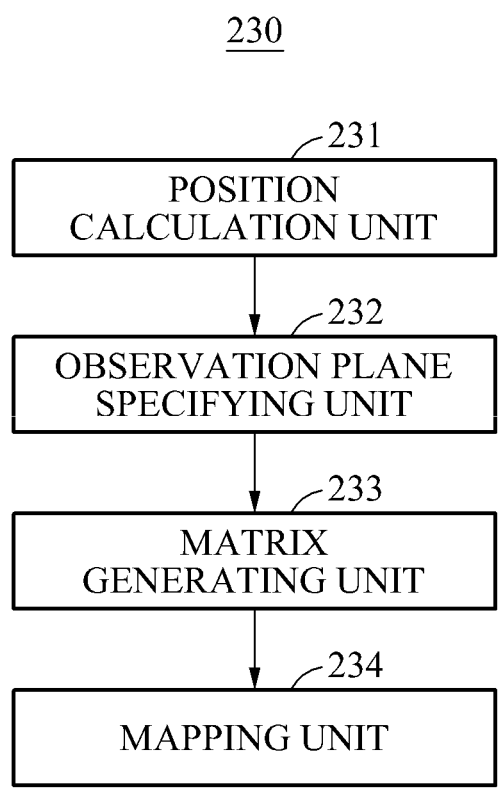
FIG. 9 is a block diagram illustrating a ray model generating unit of FIGS. 2A-2C.

FIG. 9 is a block diagram illustrating the ray model generating unit of FIGS. 2A-2C, and FIG. 10 illustrates an operating method of the ray model generating unit.

Referring to FIG. 9, the ray model generating unit 230 may include a position calculation unit 231, an observation plane specifying unit 232, a matrix generating unit 233, and a mapping unit 234.

The position calculation unit 231 may calculate a position of each lens included in the plurality of lens arrays 130 with respect to the display panel 110 based on the calibrated geometric model of the T-IID 100. The position calculation unit 231 may store the calculated positions in a set H. The set H may be expressed by Equation 7.

$$H=\{H^{(j)}\}=\{[s^{(j)}, t^{(j)}, g]^T\}, j=1,2,\ldots, N_L$$ [Equation 7]

Figure 10:
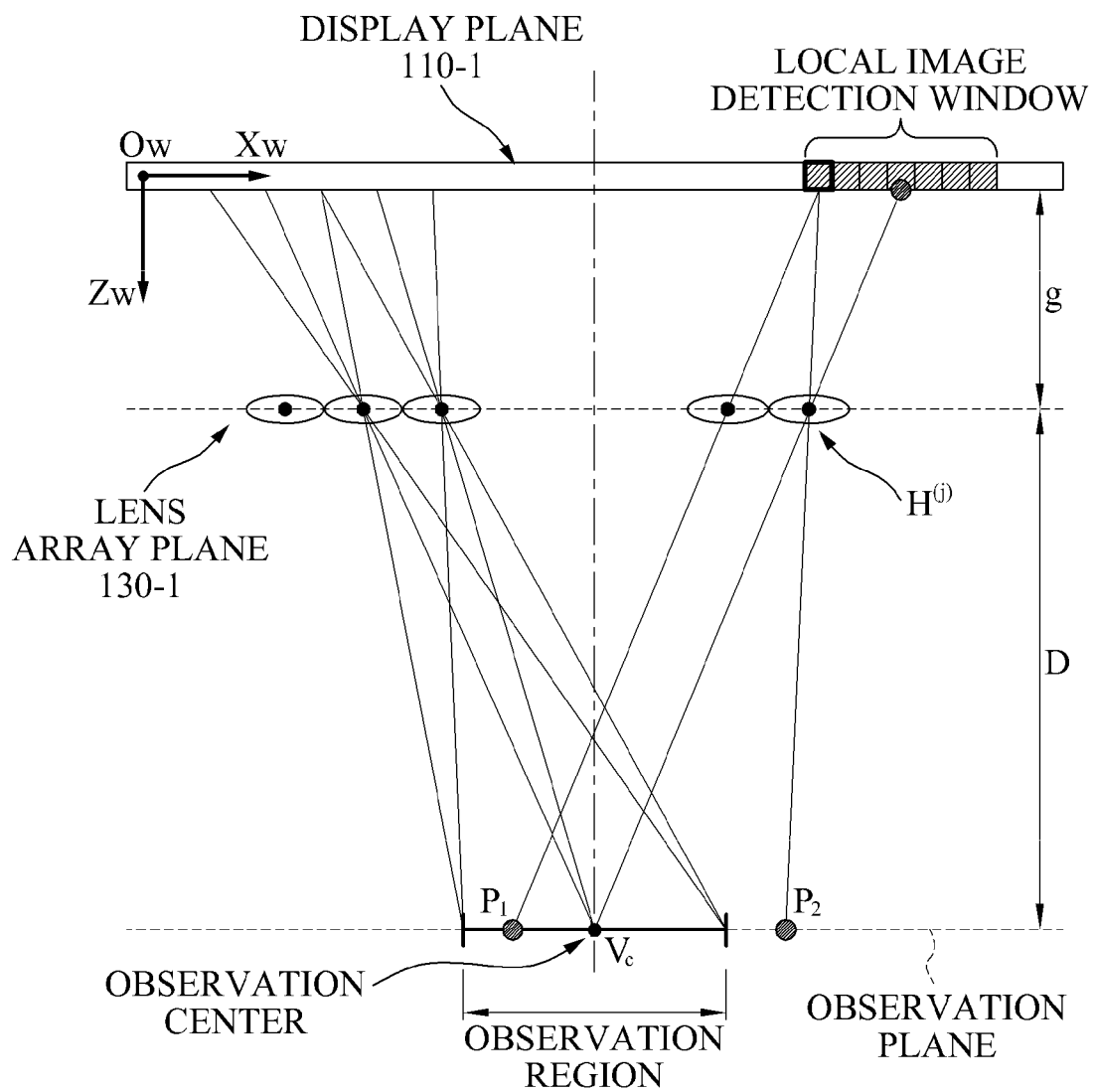
FIG. 10 illustrates an operating method of a ray model generating unit.

In Equation 7, H(j) denotes 3D coordinates of an optical center of a j-th lens in the coordinate system OwXwYwZw. Identifiers s(j), t(j), and g denote an x coordinate, a y coordinate, and a z coordinate of the optical center of the j-th lens in the coordinate system OwXwYwZw, respectively. NL denotes a number of lenses. As shown in FIG. 10, the lens array plane 130-1 may be parallel to the display panel plane 110-1 and thus, a distance between an optical center of each lens and the display panel 110 may be equal to a focal length g in a direction Zw.

A position (x(j), y(j)) of the j-th lens of a lens array on the lens array plane 130-1 may be obtained based on the calibrated geometric model of the T-IID 100. The position calculation unit 231 may calculate the position of the j-th lens of the k-th lens array with respect to the display panel 110 using Equation 8 based on a rotation and translation parameter $G=[\cos(a^{(k)}), \sin(a^{(k)}), t_x^{(k)}, t_y^{(k)}]^T$ of the lens array with respect to the display panel 110.

$$\begin{bmatrix} s^{(j)} \\ t^{(j)} \end{bmatrix} = \begin{bmatrix} \cos(a^{(k)}) & -\sin(a^{(k)}) \\ \sin(a^{(k)}) & \cos(a^{(k)}) \end{bmatrix} \begin{bmatrix} x^{(j)} \\ y^{(j)} \end{bmatrix} + \begin{bmatrix} t_x^{(k)} \\ t_y^{(k)} \end{bmatrix}$$ [Equation 8]

The observation plane specifying unit 232 may specify an observation plane and determine an observation center Vc on the observation plane. For example, an observation distance D may be an empirical value (or value based on empirical evidence), and the observation center Vc may be a point of intersection between a central vertical line of the display panel plane 110-1 and the observation plane.

The matrix generating unit 233 may generate a pixel coordinate system [m,n]T of an EIA image, where m denotes an abscissa of a pixel in the EIA image, and n denotes an ordinate of a pixel in the EIA image. For example, m and n may be positive integers. The matrix generating unit 233 may generate a mapping matrix [S(m,n),T(m,n)] of the EIA image with respect to each lens of the plurality of lens arrays 130 based on the pixel coordinate system [m,n]T of the EIA image. S(m,n) and T(m,n) denote horizontal and vertical coordinates x and y of an optical center of a lens corresponding to a pixel in an m-th row and an n-th column included in the EIA image in the coordinate system OwXwYwZw, respectively. For example, S(m,n) and T(m,n) may be initialized to "0".

The mapping unit 234 may map each pixel of the display panel 110 to a center of a corresponding lens based on the position H(j), the observation center Vc, and the mapping matrix [S(m,n),T(m,n)]. For example, the mapping unit 234 may map the observation center Vc to the display panel plane 110-1 through an optical center of a single lens, for example, H(j), and set a local image window based on the pixel mapped to the display panel plane 110-1. With respect to each pixel included in the local image window, the mapping unit 234 may set S(q,w) and T(q,w) as s(j) and t(j) when s(q,w)=0. When S(q,w) 0, the mapping unit 234 may obtain a point P1 by mapping a current pixel to the observation plane through $[S(q, w) T(q, w), g]^T$, and obtain a point P2 by mapping the current pixel to the observation plane. The mapping unit 234 may compare a distance |VcP1| from the observation center Vc to the point P1 to a distance |VcP2| from the observation center Vc to the point P2. When |VcP1|≥|VcP2|, the mapping unit 234 may set S(q,w) and T(q,w) as s(j) and t(j). When |VcP1|<|VcP2|, the mapping unit 234 may maintain original values of S(q,w) and T(q,w). For example, a local detection window may be a quadrangular window, and have a side length of 1.2p(D+g)/(D·s). In this example, p denotes a distance (lens diameter) between centers of adjacent lenses, s denotes a distance (physical area of pixel) between centers of adjacent pixels of the display panel 110, and 1.2 may be an empirical value (or based on empirical evidence).

The mapping unit 234 may assure overlapping between local image windows corresponding to the adjacent lenses, perform a comparison of |VcP1| to |VcP2| at least twice with respect to each pixel of the EIA image, and map each pixel to a center of a single lens (e.g., an optimal lens). The mapping unit 234 may generate a ray model {U(m,n),V(m,n), S(m,n),T(m,n)} displayed using a two plane straight notation based on a result of the mapping. One plane may be the display panel plane 1110-1, and the other plane may be the lens array plane 130-1. [U(m,n),V(m,n)] may denote 2D coordinates of a point of intersection between light and the display plane 110-1 in a coordinate system of the display plane 110-1. [S(m,n),T(m,n)] may denote 2D coordinates of a point of intersection between light and a lens array optical center plane in a coordinate system of the lens array optical center plane. The mapping unit 234 may transmit the ray model {U(m,n),V(m,n), S(m,n),T(m,n)} to the rendering unit 240.

The rendering unit 240 may generate an EIA image to accurately display a 3D image by rendering the EIA image based on the ray model received from the ray model generator 230. For example, the rendering unit 240 may detect corresponding light in a 3D space with respect to each pixel included in an EIA based on the ray model, and calculate a point of intersection between light and a digital model of a virtual object based on the digital model. The rendering unit 240 may calculate a color value based on light on a surface of an object located at the point of intersection, and assign the calculated color value to an EIA pixel. The rendering unit 240 may complete rendering with respect to each pixel by performing the foregoing operation.

The image processing device 200 may calibrate a geometric model of the T-IID 100, generate a ray model based on the calibrated geometric model of the T-IID 100, and render an EIA based on the generated ray model. Thus, the T-IID 100 may accurately display a 3D image even if a misalignment is present. When a misalignment is present in the T-IID 100 (e.g., due to an initial misalignment of the lens array, a change in environment, and/or oscillation), the image processing device 200 may easily calibrate the misalignment to maintain an improved (or alternatively, optimal) state of a 3D display. Such an automatic calibration may be implemented using a single capturing unit 210 included in the image processing device 200.

Figure 11:
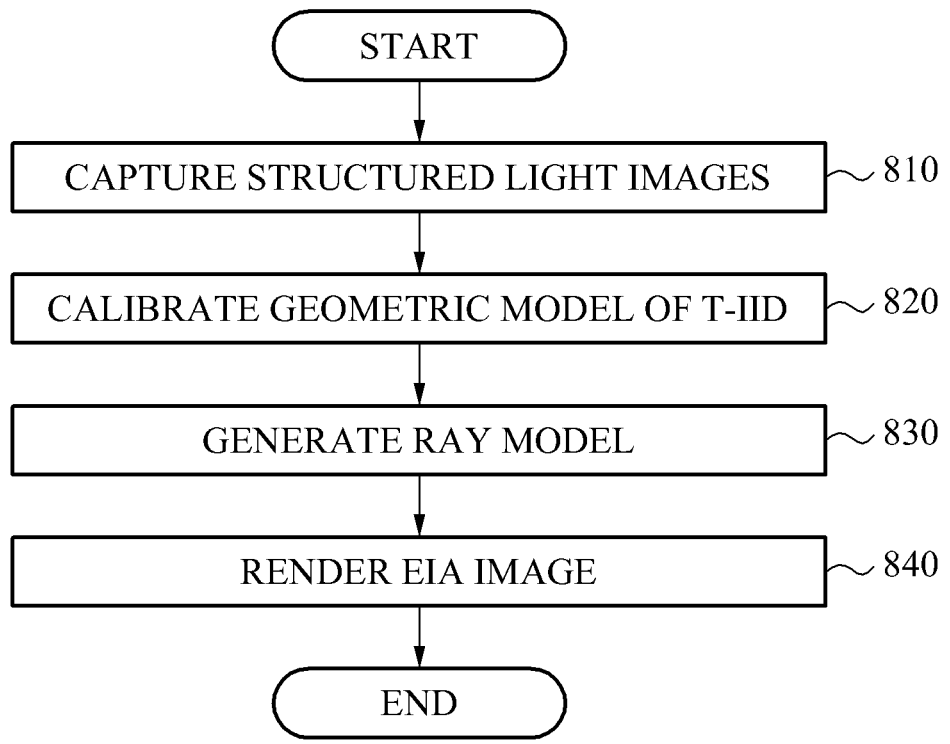
FIG. 11 is a flowchart illustrating an operating method of the image processing device of FIGS. 2A-2C.

FIG. 11 is a flowchart illustrating an operating method of the image processing device of FIGS. 2A-2C.

Referring to FIG. 11, in operation 810, the capturing unit 210 may capture a plurality of structured light images displayed on the display panel 110, and transmit the captured plurality of structured light images to the calibration unit 220.

In operation 820, the calibration unit 220 may calibrate a geometric model of the T-IID 100 based on the captured plurality of structured light images.

In operation 830, the ray model generating unit 230 may generate a ray model based on the calibrated geometric model of the T-IID 100.

In operation 840, the rendering unit 240 may render an EIA image based on the ray model received from the ray model generating unit 230.

Figure 12:
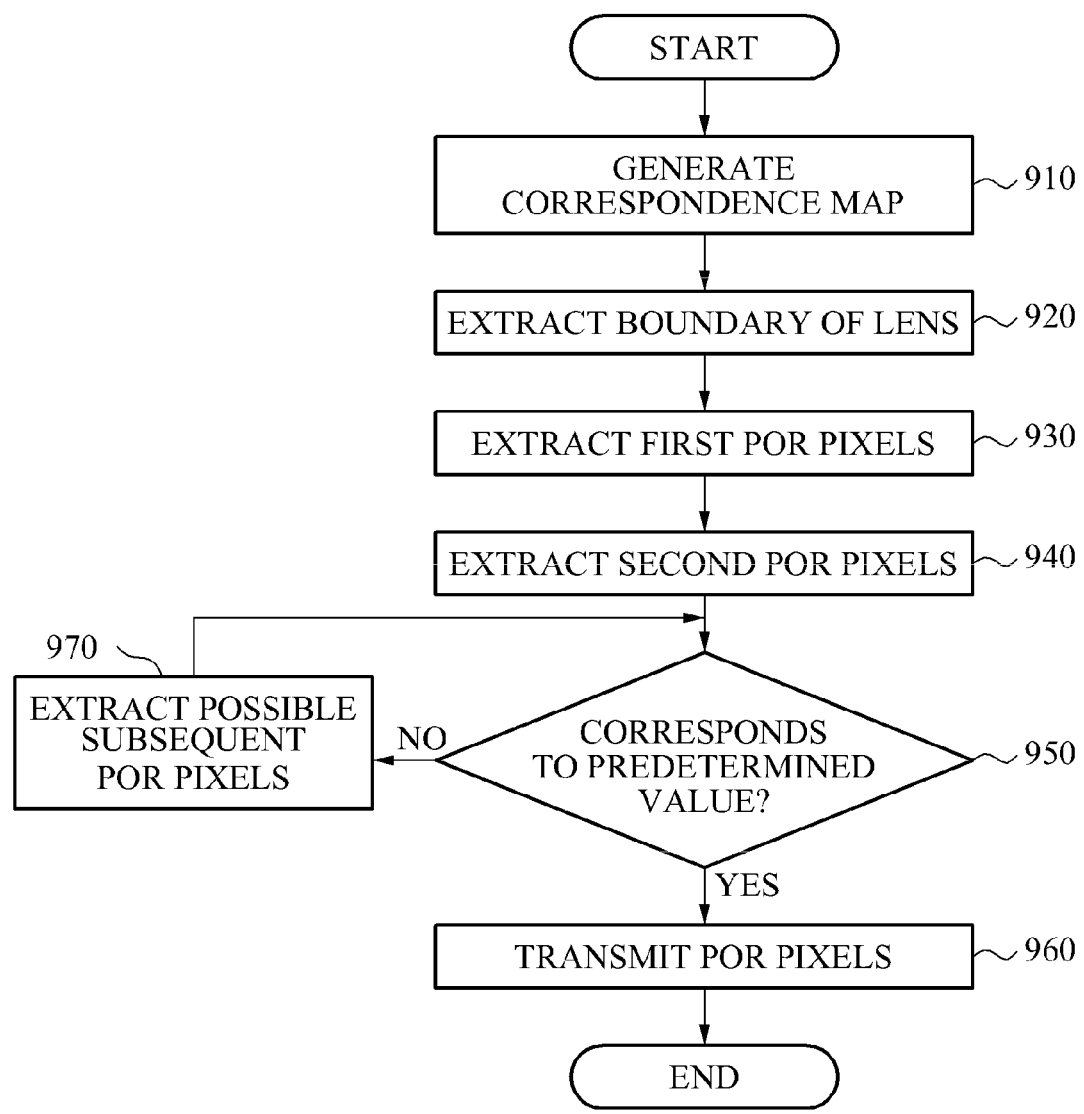
FIG. 12 is a flowchart illustrating an operating method of the POR extraction unit of FIGS. 2A-2C.

FIG. 12 is a flowchart illustrating an operating method of the POR extraction unit of FIGS. 2A-2C.

Referring to FIG. 12, in operation 910, the pixel analysis unit 271 may generate a correspondence map between pixels of the display panel 110 and pixels of the capturing unit 210 by decoding a plurality of structured light images captured by the capturing unit 210. The decoding process may be as follows. The plurality of structured light images may include 'N' number of images. These N images are displayed on the T-IID 100 one by one. During a calibration operation, the capturing unit 210 is fixed at a desired viewpoint and captures the N images. Thus, for each pixel in the captured image coordinate frame, there are N recorded brightness values from the N captured images. The N brightness values form a vector of length N, which may be mapped to a position value in the T-IID 100. This process of mapping the N-valued vector of a captured image pixel to a position in the T-IID 100 may be referred to as "decoding" herein. The decoding may establish a dense correspondence between pixels in the captured image to positions in the T-IID 100.

In operation 920, the edge extraction unit 272 may extract a boundary of a lens included in the plurality of lens arrays 130 by filtering the correspondence map through a gradient filter.

In operation 930, the pixel extraction unit 273 may extract first POR pixels from the plurality of structured light images based on the extracted boundary of the lens.

In operation 940, the pixel extraction unit 273 may extract second POR pixels based on the first POR pixels and respective structures of the plurality of lens arrays 130.

In operation 950, the pixel extraction unit 273 may verify whether a sum of a number of the first POR pixels and a number of the second POR pixels is equal to or greater than a second desired (or alternatively, predetermined) value.

When the sum of the number of the first POR pixels and the number of the second POR pixels is equal to or greater than the second desired (or alternatively, predetermined) value, the pixel extraction unit 273 may transmit the first POR pixels and the second POR pixels to the lens array calibration unit 290, in operation 960.

In operation 970, the pixel extraction unit 273 may extract possible subsequent POR pixels based on the first POR pixels, the second POR pixels, and the respective structures of the plurality of lens arrays 130 if the sum of the number of the first POR pixels and the number of the second POR pixels is less than the second desired (or alternatively, predetermined) value. Thus, the pixel extraction unit 273 may iteratively perform the foregoing process until the number of the POR pixels corresponds to the second desired (or alternatively, predetermined) value.

Figure 13:
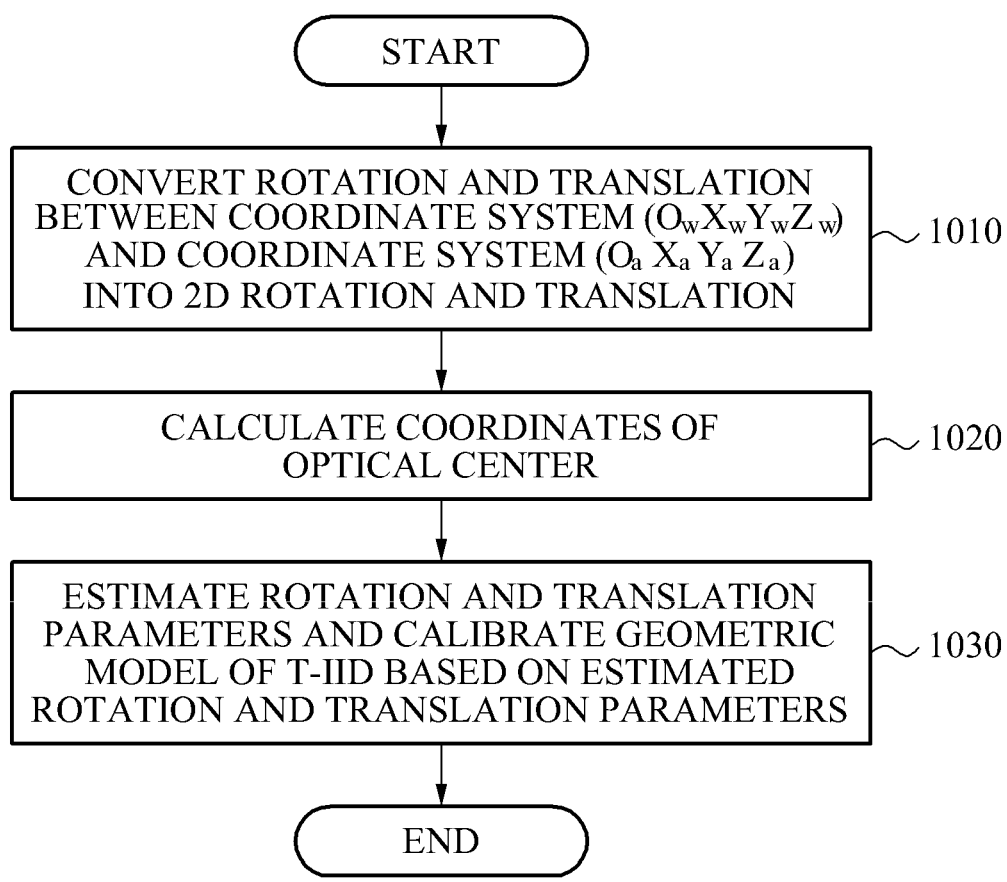
FIG. 13 is a flowchart illustrating an operating method of the lens array calibration unit of FIGS. 2A-2C.

FIG. 13 is a flowchart illustrating an operating method of the lens array calibration unit of FIGS. 2A-2C.

Referring to FIG. 13, in operation 1010, the conversion unit 291 may convert rotation and translation between a coordinate system OwXwYwZw and a coordinate system OaXaYaZa into 2D rotation and translation, as expressed by Equation 1 above.

In operation 1020, the optical center calculation unit 292 may calculate coordinates of an optical center $O_c=[O_x, O_y, O_z]^T$ of the capturing unit 210 based on POR pixels extracted by the POR extraction unit 270.

In operation 1030, the parameter estimation unit 293 may estimate rotation and translation parameters of the plurality of lens arrays 130 with respect to the display panel 110 based on the 2D rotation and translation, and the coordinates of the optical center of the capturing unit 210, and calibrate a geometric model of the T-IID 100 based on the estimated rotation and translation parameters.

FIG. 14 is a flowchart illustrating an operating method of the ray model generating unit of FIGS. 2A-2C.

Referring to FIG. 14, in operation 1110, the position calculation unit 231 may calculation a position of each lens included in the plurality of lens arrays 130 with respect to the display panel 110 based on a calibrated geometric model of the T-IID 100.

In operation 1120, the observation plane specifying unit 232 may specify an observation plane and determine an observation center Vc on the observation plane.

In operation 1130, the matrix generating unit 233 may generate a pixel coordinate system [m,n]T of an EIA image.

In operation 1140, the matrix generating unit 233 may generate a mapping matrix [S(m,n),T(m,n)] of the EIA image with respect to each lens of the plurality of lens arrays 130 based on the pixel coordinate system [m,n]T of the EIA image.

In operation 1150, the mapping unit 234 may map each pixel of an LCD to a center of a corresponding lens based on the position H(j), the observation center Vc, and the mapping matrix [S(m,n),T(m,n)].

In operation 1160, the mapping unit 234 may generate a ray model {U(m,n),V(m,n), S(m,n),T(m,n)} displayed using a two plane straight notation based on a result of the mapping.

In view of the foregoing description, it should be understood that inventive concepts allow for large-screen naked-eye 3D displays to be equipped with an advantageous calibration method. Related art devices rely on precise manufacturing of lens arrays and factory calibration methods with special markers and camera arrangements. According to at least one example embodiment, however, lens arrays may be manufactured with less stringent fabrication methods due to improved calibration accuracy, thereby reducing manufacturing costs. Further, methods and devices according to at least one example embodiment may simplify the calibration process for 3D displays by removing the need for special markers and cameras, thereby allowing for relatively straightforward user-side calibration of 3D displays with a consumer camera.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of calibrating a three-dimensional (3D) image in a tiled display that includes a display panel and a plurality of lens arrays, the method of comprising:
    capturing a plurality of structured light images displayed on the display panel;
    calibrating a geometric model of the tiled display based on the plurality of structured light images;
    generating a ray model based on the calibrated geometric model of the tiled display; and
    rendering an image based on the ray model,
    wherein the calibrating comprises:
        extracting principal observation ray (POR) pixels corresponding to light rays passing through an optical center of a capturing device from the plurality of structured light images; and
        calibrating the geometric model of the tiled display based on the extracted POR pixels.

2. The method of claim 1, wherein the extracting comprises generating a correspondence map between pixels of the display panel and pixels of the capturing device by decoding the plurality of structured light images, and extracting the POR pixels using the correspondence map.

3. The method of claim 1, wherein the extracting comprises:
    generating a correspondence map between pixels of the display panel and pixels of the capturing device by decoding the plurality of structured light images;
    extracting a boundary of a lens included in the plurality of lens arrays by filtering the correspondence map through a gradient filter;
    extracting first POR pixels from the plurality of structured light images based on the extracted boundary;
    extracting second POR pixels based on the extracted first POR pixels and respective structures of the plurality of lens arrays; and
    verifying whether a sum of a number of the first POR pixels and a number of the second POR pixels corresponds to a desired value, and transmitting the first POR pixels and the second POR pixels based on a result of the verifying.

4. The method of claim 1, wherein the calibrating comprises calculating rotation and translation parameters of the plurality of lens arrays with respect to the display panel based on the extracted POR pixels, and calibrating the geometric model of the tiled display based on the calculated rotation and translation parameters.

5. The method of claim 1, wherein the calibrating comprises:
    converting rotation and translation between a coordinate system defined on a plane of the plurality of lens arrays and a coordinate system defined on a plane of the display panel into two-dimensional (2D) rotation and translation;
    calculating coordinates of the optical center of the capturing device based on the extracted POR pixels;
    estimating the rotation and translation parameters based on the 2D rotation and translation and the coordinates of the optical center; and
    calibrating the geometric model of the tiled display based on the estimated rotation and translation parameters.

6. The method of claim 1, wherein the generating comprises:
    calculating a position of each lens included in the plurality of lens arrays with respect to the display panel based on the calibrated geometric model of the tiled display;
    specifying an observation plane and determining an observation center on the observation plane;
    generating a pixel coordinate system of the image and generating a mapping matrix based on the pixel coordinate system; and
    generating the ray model by mapping each pixel of the display panel to a center of a corresponding lens based on the calculated position, the determined observation center, and the generated mapping matrix.

7. The method of claim 6, further comprising:
    displaying the ray model using a two plane straight notation.

8. The method of claim 3, wherein the extracting of the second POR pixels comprises:
    predicting positions of the second POR pixels based on the first POR pixels;
    determining a detection window based on the predicted positions of the second POR pixels;

generating a value of an energy function based on a local gradient amplitude histogram with respect to pixels included in the detection window; and extracting the second POR pixels from the pixels included in the detection window based on the value of the energy function.

9. A display system comprising:
a tiled display comprising a display panel and a plurality of lens arrays; and
an image processing device configured to
  capture a plurality of structured light images displayed on the display panel,
  calibrate a geometric model of the tiled display based on the plurality of structured light images,
  generate a ray model based on the calibrated geometric model of the tiled display, and
  render an image based on the ray model,
the image processing device being configured such that the calibrating includes
  extracting principal observation ray (POR) pixels corresponding to light rays passing through an optical center of a capturing device from the plurality of structured light images, and
  calibrating the geometric model of the tiled display based on the extracted POR pixels.

10. The display system of claim 9, wherein the image processing device comprises:
the capturing device, the capturing device being configured to capture the plurality of structured light images;
a calibration device configured to calculate rotation and translation parameters of the plurality of lens arrays with respect to the display panel based on the plurality of structured light images, and calibrate the geometric model of the tiled display based on the calculated rotation and translation parameters;
a ray model generating a device configured to capture the ray model based on the calibrated geometric model of the tiled display; and
a rendering device configured to render the image based on the ray model.

11. The display system of claim 10, wherein the calibration device comprises:
a POR extraction device configured to extract the POR pixels corresponding to light rays passing through the optical center of the capturing device from the plurality of structured light images; and
a lens array calibration device configured to calculate the rotation and translation parameters based on the extracted POR pixels, and calibrate the geometric model of the tiled display based on the rotation and translation parameters.

12. The display system of claim 11, wherein the POR extraction device is configured to generate a correspondence map between pixels of the display panel and pixels of the capturing device by decoding the plurality of structured light images, and extract the POR pixels using the correspondence map.

13. The display system of claim 11, wherein the POR extraction device comprises:
a pixel analysis device configured to generate a correspondence map between pixels of the display panel and pixels of the capturing device by decoding the plurality of structured light images;
an edge extraction device configured to extract a boundary of a lens included in the plurality of lens arrays by filtering the correspondence map through a gradient filter; and
a pixel extraction device configured to extract first POR pixels and second POR pixels based on the extracted boundary and respective structures of the plurality of lens arrays, verify whether a sum of a number of the first POR pixels and a number of the second POR pixels corresponds to a desired value, and transmit the first POR pixels and the second POR pixels, based on a result of the verifying.

14. The display system of claim 11, wherein the lens array calibration device comprises:
a conversion device configured to convert rotation and translation between a coordinate system defined on a plane of the plurality of lens arrays and a coordinate system defined on a plane of the plurality of lens arrays and a coordinate system defined on a plan of the display panel into two-dimensional (2D) rotation and translation;
an optical center calculation device configured to calculate coordinates of the optical center of the capturing device based on the extracted POR pixels; and
a parameter estimation device configured to estimate the rotation and translation parameters based on the 2D rotation and translation and the coordinates of the optical center, and calibrate the geometric model of the tiled display based on the estimated rotation and translation parameters.

15. A device for calibrating a three-dimensional (3D) image in a tiled display that includes a display panel and a plurality of lens arrays, comprising:
an image processing device configured to
  receive a plurality of images captured from the display panel by a capturing device, the plurality of images having desired image patterns on the display panel,
  calibrate a geometric model of the tiled display based on the plurality of images,
  generate a ray model based on the calibrated geometric model of the tiled display, and
  render an image based on the ray model,
wherein the image processing device is configured to
  extract principal observation ray (POR) pixels corresponding to light rays passing through an optical center of the capturing device from the plurality of images, and
  calibrate the geometric model of the tiled display based on the extracted POR pixels.

16. The device of claim 15, wherein the image processing device is configured to extract the POR pixels by
generating a correspondence map between pixels of the display panel and pixels of the capturing device by decoding the plurality of images, and
extracting the POR pixels using the correspondence map.

17. The device of claim 15, wherein the image processing device is configured to extract the POR pixels by
generating a correspondence map between pixels of the display panel and pixels of the capturing device by decoding the plurality of images,
extracting a boundary of a lens included in the plurality of lens arrays by filtering the correspondence map through a gradient filter,
extracting first POR pixels from the plurality of images based on the extracted boundary,
extracting second POR pixels based on the extracted first POR pixels and respective structures of the plurality of lens arrays and,
verifying whether a sum of a number of the first POR pixels and a number of the second POR pixels corresponds to a desired value, and transmitting the first POR pixels and the second POR pixels based on a result of the verifying.

18. The device of claim 15, wherein the image processing device is configured to
calibrate the geometric model by calculating rotation and translation parameters of the plurality of lens arrays with respect to the display panel based on the extracted POR pixels, and
calibrating the geometric model of the tiled display based on the calculated rotation and translation parameters.

19. The device of claim 15, wherein the image processing device is configured to calibrate the geometric model by
converting rotation and translation between a coordinate system defined on a plane of the plurality of lens arrays and a coordinate system defined on a plane of the display panel into two-dimensional (2D) rotation and translation,
calculating coordinates of the optical center of the capturing device based on the extracted POR pixels,
estimating rotation and translation parameters based on the 2D rotation and translation and the coordinates of the optical center, and
calibrating the geometric model of the tiled display based on the estimated rotation and translation parameters.

20. The device of claim 15, wherein the image processing device is configured to generate the ray model by
calculating a position of each lens included in the plurality of lens arrays with respect to the display panel based on the calibrated geometric model of the tiled display,
specifying an observation plane and determining an observation center on the observation plane,
generating a pixel coordinate system of the image and generating a mapping matrix based on the pixel coordinate system, and
generating the ray model by mapping each pixel of the display panel to a center of a corresponding lens based on the calculated position, the determined observation center, and the generated mapping matrix.

21. The device of claim 20, wherein the image processing device is configured to cause the tiled display to display the ray model using a two plane straight notation.

22. The device of claim 17, wherein the image processing device is configured to extract the second POR pixels by
predicting positions of the second POR pixels based on the first POR pixels,
determining a detection window based on the predicted positions of the second POR pixels,
generating a value of an energy function based on a local gradient amplitude histogram with respect to pixels included in the detection window, and
extracting the second POR pixels from the pixels included in the detection window based on the value of the energy function.

23. The device of claim 15, further comprising:
at least one of wired connections and wireless connections configured to communicate information between the image processing device, the tiled display, and the capturing device, the information including the plurality of images and the rendered image.

24. The device of claim 23, further comprising:
a memory configured to store the information.

25. The device of claim 15, wherein the capturing device is a pinhole camera.

26. A method for calibrating a three-dimensional (3D) image in a tiled display that includes a display panel and a plurality of lens arrays, the method comprising:
receiving a plurality of images captured from the display panel by a capturing device, the plurality of images having desired image patterns on the display panel;
calibrating a geometric model of the tiled display based on the plurality of images;
generating a ray model based on the calibrated geometric model of the tiled display; and
rendering an image based on the ray model,
wherein the calibrating comprises:
extracting principal observation ray (POR) pixels corresponding to light rays passing through an optical center of a capturing device from the plurality of images; and
calibrating the geometric model of the tiled display based on the extracted POR pixels.

* * * * *